J. W. MADDEN & J. DODSWORTH.
Fluting-Machines.
No. 5,415. Reissued May 20, 1873.
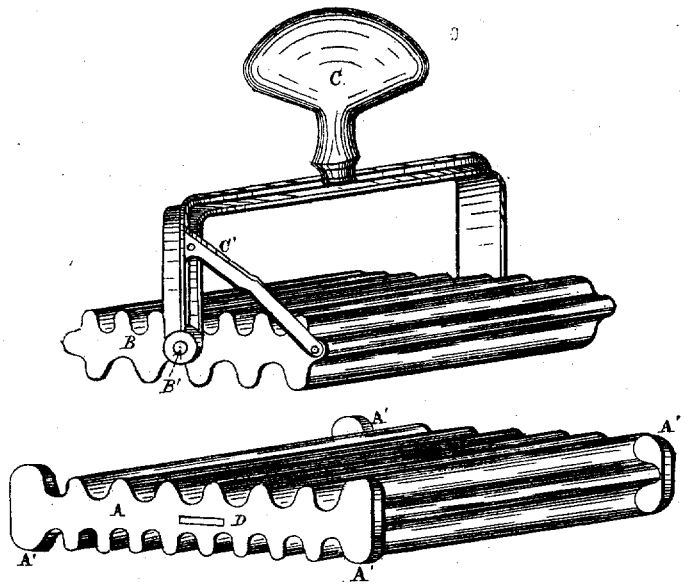
Witnesses.
A. T. Cornell
Wm C. Shipman
Inventor.
James W. Madden.
John Dodsworth.
Per. Burridge & Co
Attys.
AM. PHOTO-LITHOGRAPHIC CO. N.Y. (OSBORNE'S PROCESS.)

UNITED STATES PATENT OFFICE.

JAMES W. MADDEN AND JOHN DODSWORTH, OF BUFFALO, NEW YORK, SAID DODSWORTH ASSIGNOR, BY MESNE ASSIGNMENTS, TO JOHN HEWITT.

IMPROVEMENT IN FLUTING-MACHINES.

Specification forming part of Letters Patent No. 128,156, dated June 18, 1872; antedated June 8, 1872; reissue No. 5,415, dated May 20, 1873; application filed March 17, 1873.

*To all whom it may concern:*

Be it known that we, JAMES W. MADDEN and JOHN DODSWORTH, both of Buffalo, in the county of Erie and State of New York, have invented certain Improvements in Fluting-Machines, of which the following is a specification:

The nature of our invention consists in the arrangement of a revolving fluting-die, attached to a handle, said die being provided with corrugations on one or more sides, and operated in conjunction with a corresponding die or base, also fluted on one or more sides, which die is provided with four projections.

We refer to the accompanying drawing, which makes part of this specification, and which represents our fluting-iron in a perspective view.

Letter A represents a fluting die or base, and which may be provided with corrugations on one or more sides, and of different space or pitch, and having on its corners feet marked A′, projecting sufficiently above the corrugation to protect them when used. Both sides are corrugated. B is a revolving fluting die or iron. It is provided also with corrugations of different pitch, corresponding with base A, and also with two pivots, marked B′. C is a frame and handle, for the purpose of receiving the fluting-die B. It has bearings for the reception of the pivots of fluting-die B, and a handle for operating the die. C′ is a blade-spring, being attached to frame C on one end, and having a pin fastened to its other end. Said pin engages in corresponding holes in revolving die B, and serves, in conjunction with blade-spring C′, as a brace to hold revolving die B in its proper position. Said die B is heated from either side or edge. The base A may also be heated if desired, and for this purpose I have provided it with a slot for the insertion of an ordinary stove-lifter, or other suitable device, for handling said base while hot. In practice, however, I prefer heating the die B only.

The operation of this fluting device will be understood at once. The goods to be ruffled are placed upon the base A and forced into the corrugations through the medium of the heated die B, to which a reciprocating or rubbing motion may be imparted, for the purpose of polishing the same. To reverse revolving die B release blade-spring C from die B, when die B may be revolved as desired and heated again, by engaging blade-spring C′ with die B.

It will be observed that the corrugations on the sides of base A and revolving die B are of different space or pitch, which will give the operator a variety of flutes and allow a change in the work to be fluted. One side only of the base and die may be corrugated, whereas the other sides of each may be a plane surface.

*Claims.*

1. A fluting-machine consisting of the base-plate A and counter-die B, said parts having varying flutes on their opposite faces, and being reversible for conjoint operation, sub-substantially as described.

2. A fluting-machine consisting of two separate parts or sections, A B, having corrugations on one or more of their faces in the same plane, constructed and arranged substantially as described, so that the material to be fluted when laid upon the part or base A, besides being fluted, is rubbed down and polished by a reciprocating action given to the part or die B, as described.

In testimony whereof we have signed our names to this specification before witnesses.

JAMES W. MADDEN.
JOHN DODSWORTH.

Witnesses:
THOMAS SMITH,
FRANKN. LEONARD.